(12) United States Patent
Chiu et al.

(10) Patent No.: US 11,063,434 B2
(45) Date of Patent: Jul. 13, 2021

(54) METHOD AND APPARATUS FOR REINFORCEMENT LEARNING BASED ENERGY BIDDING

(71) Applicant: National Tsing Hua University, Hsinchu (TW)

(72) Inventors: Wei-Yu Chiu, Hsinchu (TW); Chan-Wei Hu, Hsinchu (TW)

(73) Assignee: National Tsing Hua University, Hsinchu (TW)

( * ) Notice: Subject to any disclaimer, the term of this patent is extended or adjusted under 35 U.S.C. 154(b) by 139 days.

(21) Appl. No.: 16/508,321

(22) Filed: Jul. 11, 2019

(65) Prior Publication Data

US 2020/0366094 A1    Nov. 19, 2020

(30) Foreign Application Priority Data

May 13, 2019 (TW) .................................. 108116387

(51) Int. Cl.
    *H02J 3/28*            (2006.01)
    *H02J 3/38*            (2006.01)
    (Continued)

(52) U.S. Cl.
    CPC ................. *H02J 3/28* (2013.01); *G06N 5/02* (2013.01); *G06N 7/005* (2013.01); *H02J 3/383* (2013.01);
    (Continued)

(58) Field of Classification Search
    CPC .... H02J 3/28; H02J 3/383; H02J 3/386; H02J 3/003; H02J 2203/20; G06N 5/02;
    (Continued)

(56) References Cited

U.S. PATENT DOCUMENTS

| 2002/0107773 A1* | 8/2002 | Abdou | ................... | G06Q 40/04 |
| | | | | 705/37 |
| 2003/0144864 A1* | 7/2003 | Mazzarella | ............. | H02J 3/004 |
| | | | | 705/412 |

(Continued)

FOREIGN PATENT DOCUMENTS

| CN | 107644370 | 1/2018 |
| TW | 201816698 | 5/2018 |

OTHER PUBLICATIONS

Byung-Gook Kim, et al., "Dynamic Pricing and Energy Consumption Scheduling with Reinforcement Learning," IEEE Transactions on Smart Grid, vol. 7, Sep. 2016, pp. 2187-2198.

*Primary Examiner* — Thomas C Lee
*Assistant Examiner* — Ameir Myers
(74) *Attorney, Agent, or Firm* — JCIPRNET

(57) ABSTRACT

A method and an apparatus for reinforcement learning based energy bidding, adapted for an energy aggregator to determine the energy supply configuration between multiple energy suppliers and multiple energy demanders, are provided. In the method, a supply amount of each energy supplier and a demand amount of each energy demander are acquired. A total demand amount of the energy demanders is calculated and replied to each energy supplier, and a total supply amount of the energy suppliers is calculated and replied to each energy demander. An electricity purchase quotation determined by each energy demander according to respective demand amount and the total supply amount, and an electricity sale quotation determined by each energy supplier according to respective supply amount and the total demand amount are received. A linear programming method is adopted to determine the energy supply configuration between the energy suppliers and the energy demanders according to information.

12 Claims, 3 Drawing Sheets

(51) Int. Cl.
　　　*G06N 5/02*　　　　(2006.01)
　　　*H02J 3/00*　　　　(2006.01)
　　　*G06N 7/00*　　　　(2006.01)
(52) U.S. Cl.
　　　CPC ............... *H02J 3/386* (2013.01); *H02J 3/003* (2020.01); *H02J 2203/20* (2020.01)
(58) Field of Classification Search
　　　CPC ...... G06N 7/005; G06Q 30/08; G06Q 50/188; G06Q 10/04; G06Q 10/06315; G06Q 40/04; G06Q 30/0611; Y04S 50/10; Y04S 10/50; G05B 13/041; Y02E 40/70
　　　See application file for complete search history.

(56) References Cited

U.S. PATENT DOCUMENTS

| | | | |
|---|---|---|---|
| 2011/0238583 A1 | 9/2011 | Uckun | |
| 2015/0379542 A1* | 12/2015 | Lian | G06Q 30/0206 705/7.35 |
| 2019/0279315 A1* | 9/2019 | Takeuchi | G06Q 50/06 |
| 2020/0160411 A1* | 5/2020 | Sun | G06N 7/005 |

* cited by examiner

METHOD AND APPARATUS FOR REINFORCEMENT LEARNING BASED ENERGY BIDDING

CROSS-REFERENCE TO RELATED APPLICATION

This application claims the priority benefit of Taiwan application serial no. 108116387, filed on May 13, 2019. The entirety of the above-mentioned patent application is hereby incorporated by reference herein and made a part of this specification.

TECHNICAL FIELD

The invention relates to a method and an apparatus for bidding, and more particularly, to a method and an apparatus for reinforcement learning based energy bidding.

BACKGROUND

In recent years, renewable energy sources (RES) have received increasing attention due to their advantages like low air pollution, low environmental impact, and high safety. Electricity of the renewable energy sources is derived from natural resources such as wind, tides, and geothermal energy, and is more environmentally friendly than traditional power generation method. Therefore, in the current composition of energy use in various countries, the proportion of renewable energy sources has grown significantly.

Because a power generation amount of the renewable energy sources is unstable due to environmental changes, the market price fluctuates more severely. Currently, there is a liberalized electricity trading structure that allows an energy aggregator to coordinate energy supply configurations and prices between green energy users and green energy power producers. The energy aggregator negotiates prices with the green energy power producers on behalf of the users to determine how much electricity should be purchased and which of the power producers should the electricity be purchased from.

At present, prices are mostly negotiated by iterative calculations followed by looking for a balance point to obtain the solution. However, such method needs to make assumptions on the profit model of a power producer and a power user, which is not easy to achieve in practice. Even if an estimation method is used to overcome the related difficulties, privacy leakage will still be a problem to be solved. On the other hand, in order to ensure convergence of the iterative calculations, the profit model of the power producer end and the power user is usually limited by the assumption of the quadratic function.

SUMMARY

The invention provides a method and an apparatus for reinforcement learning based energy bidding, which can optimize a profit of the aggregator, a profit of the power producer of the renewable energy sources, and an expense of the green energy user.

The invention provides a method for reinforcement learning based energy bidding, which is adapted for an energy aggregator to determine an energy supply configuration between multiple energy suppliers and multiple energy demanders. In the method, a supply amount of each of the energy suppliers and a demand amount of each of the energy demanders are acquired. A total demand amount of the energy demanders is calculated and replied to each energy supplier, and a total supply amount of the energy suppliers is calculated and replied to each energy demander. An electricity purchase quotation determined by each energy demander according to its own demand amount and the total supply amount, and an electricity sale quotation determined by each energy supplier according to its own supply amount and the total demand amount are received. A linear programming (LP) method is adopted to determine the energy supply configuration between the energy suppliers and the energy demanders according to the supply amount and the electricity sale quotation of each energy supplier and the demand amount and the electricity purchase quotation of each energy demander.

In an embodiment of the invention, the step of adopting the linear programming method to determine the energy supply configuration between the energy suppliers and the energy demanders according to the supply amount and the electricity sale quotation provided by each of the energy suppliers and the demand amount and the electricity purchase quotation provided by each of the energy demanders includes: by using a product of a purchase price vector of the electricity purchase quotations of the energy demanders and an electricity purchase amount vector of electricity purchase quotas assigned to the energy demanders as an income and using a product of a sale price vector of the electricity sale quotations of the energy suppliers and an electricity sale amount vector of electricity sale quotas assigned to the energy suppliers as an expense, adopting the linear programming method to obtain a solution for maximizing a difference between the income and the expanse, and accordingly determining the energy supply configuration.

In an embodiment of the invention, the step of adopting the linear programming method to determine the energy supply configuration between the energy suppliers and the energy demanders according to the supply amount and the electricity sale quotation provided by each of the energy suppliers and the demand amount and the electricity purchase quotation provided by each of the energy demanders includes: sorting the electricity sale quotations of the energy suppliers in an ascending order, and selecting the energy suppliers as a power supply source starting from the energy supplier having a lowest electricity sale quotation among the electricity sale quotations until a total supply amount of the selected energy suppliers reaches the total demand amount.

The invention provides an energy bidding apparatus for reinforcement learning based energy bidding, and the energy bidding apparatus serves as an energy aggregator to determine an energy supply configuration between a plurality of energy suppliers and a plurality of energy demanders. The energy bidding apparatus includes a connection device, a storage device and a processor. The connection device is configured to connect each of the energy suppliers and each of the energy demanders. The storage device is configured to store a computer program. The processor is coupled to the connection device and the storage device, and configured to load in and execute the computer program for: acquiring a supply amount of each of the energy suppliers and a demand amount of each of the energy demanders; calculating and replying a total demand amount of the energy demanders to each of the energy suppliers, and calculating and replying a total supply amount of the energy suppliers to each of the energy demanders; receiving an electricity purchase quotation determined by each of the energy demanders according to the respective demand amount and the total supply amount and an electricity sale quotation determined by each of the energy suppliers according to the respective supply amount and the total demand amount; and adopting a linear programming method to determine the energy supply configuration between the energy suppliers and the energy demanders according to the supply amount and the electricity sale quotation provided by each of the energy suppliers and the demand amount and the electricity purchase quotation provided by each of the energy demanders.

In an embodiment of the invention, each of the energy suppliers calculates a difference between the respective supply amount and the total demand amount of the energy demanders and checks a reinforcement learning table established based on a reinforcement learning method to find a recommended quotation adapted for the difference as the electricity sale quotation provided to the energy aggregator.

In an embodiment of the invention, each of the energy suppliers further proposes a plurality of electricity sale quotations in response to the difference between the supply amount and the total demand amount to the energy aggregator, receives an electricity sale amount assigned by the energy aggregator in response to each of the electricity sale quotations to calculate an electricity sale profit for each of the proposed electricity sale quotations, selects the electricity sale quotation corresponding to a highest electricity sale profit among the electricity sale profits as the recommended quotation adapted for the difference, and records the recommended quotation in the reinforcement learning table.

In an embodiment of the invention, each of the energy demanders calculates a difference between the respective demand amount and the total supply amount of the energy suppliers and checks a reinforcement learning table established based on a reinforcement learning method to find a recommended quotation adapted for the difference as the electricity purchase quotation provided to the energy aggregator.

In an embodiment of the invention, each of the energy demanders further proposes a plurality of electricity purchase quotations in response to the difference between the demand amount and the total supply amount to the energy aggregator, receives an electricity purchase amount assigned by the energy aggregator in response to each of the electricity purchase quotations to calculate an electricity purchase expense for each of the proposed electricity purchase quotations, selects the electricity purchase quotation corresponding to a lowest electricity purchase expense among the electricity sale expenses as the recommended quotation adapted for the difference, and records the recommended quotation in the reinforcement learning table.

In an embodiment of the invention, each of the energy demanders further proposes a plurality of electricity purchase quotations in response to the difference between the demand amount and the total supply amount to the energy aggregator, receives an electricity purchase amount assigned by the energy aggregator in response to each of the electricity purchase quotations to calculate an electricity purchase expense for each of the proposed electricity purchase quotations, substitutes the demand amount and the electricity purchase amount assigned by the energy aggregator in response to each of the electricity purchase quotations into a satisfaction function to calculate a satisfaction function value, calculates a sum of the satisfaction function value and the electricity purchase expense for each of the electricity purchase quotations, selects the electricity purchase quotation corresponding to a lowest sum among the sums as the recommended quotation adapted for the difference, and records the recommended quotation in the reinforcement learning table.

In an embodiment of the invention, by using a product of a purchase price vector of the electricity purchase quotations of the energy demanders and a vector determined by electricity purchase quotas assigned to the energy demanders as an income and using a product of a sale price vector of the electricity sale quotations of the energy suppliers and a vector determined by electricity sale quotas assigned to the energy suppliers as an expense, the processor adopts the linear programming method to obtain a solution for maximizing a difference between the income and the expanse, and accordingly determines the energy supply configuration.

In an embodiment of the invention, the processor sorts the electricity sale quotations of the energy suppliers in an ascending order, and selects the energy suppliers as a power supply source starting from the energy supplier having a lowest electricity sale quotation among the electricity sale quotations until a total supply amount of the selected energy suppliers reaches the total demand amount.

To make the above features and advantages of the disclosure more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DETAILED DESCRIPTION

In the embodiments of the invention, a reinforcement learning (RL) algorithm is applied to the green energy user and the power producer of the renewable energy sources, so the two parties can minimize a total expanse/maximize a total income by making quotations according to differences between a power usage amount/a power generation amount and a total power generation amount/a total power usage amount. An aggregator dynamically calculates an energy supply configuration between the green energy user and the power producer through a linear programming method, so as to determine how much electricity should be purchased and which of the power producers should electricity be purchased from as well as how much electricity should be sold and which of the green energy users should electricity be sold to. In this way, the profit of the aggregator, the profit of the power producer of the renewable energy sources, and the expense of the green energy user may all be optimized.

Figure 1:
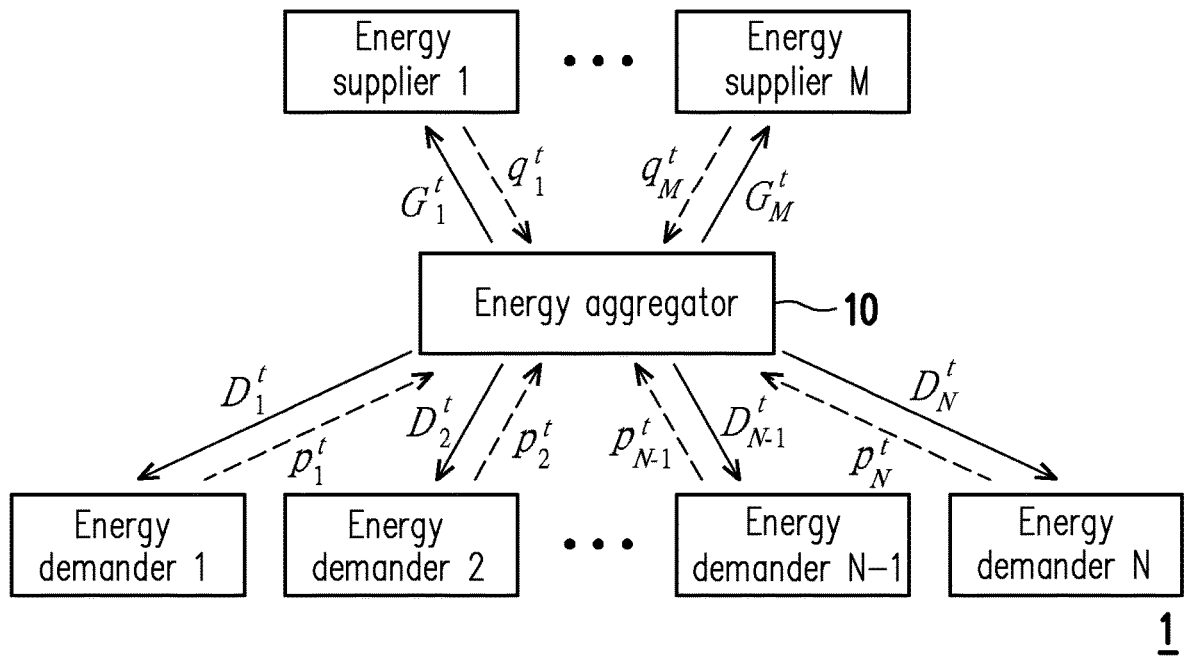
FIG. 1 illustrates an energy market model according to an embodiment of the invention.

FIG. 1 illustrates an energy market model according to an embodiment of the invention. With reference to FIG. 1, an energy market model 1 of this embodiment is composed of a plurality of energy suppliers 1 to M, a plurality of energy demanders 1 to N and an energy aggregator 10. Among them, the energy suppliers 1 to M are, for example, the green energy power producers who can transmit supply amounts $q_1^t$ to $q_M^t$ of electricity currently available to the energy aggregator 10. The energy demanders 1 to N are, for example, the green energy users who can propose demand amounts $p_1^t$ to $p_N^t$ of required electricity to the energy aggregator 10. Based on the energy market model 1, the energy aggregator 10 of this embodiment of the invention can evaluate amounts $G_1^t$ to $G_N^t$ of electricity that should be purchased from the energy suppliers 1 to M and amounts $D_1^t$ to $D_N^t$ of electricity that could be sold to the energy demanders 1 to N according to the demand amounts $p_1^t$ to $p_N^t$ of electricity proposed by the energy demanders 1 to N and the supply amounts $q_1^t$ to $q_M^t$ of electricity that the energy suppliers 1 to M can supply, so as to optimize the profit for each party.

Figure 2:
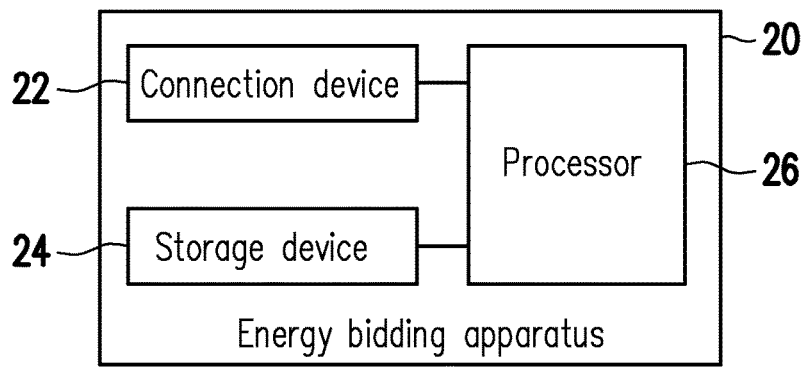
FIG. 2 is a block diagram illustrating an energy bidding apparatus according to an embodiment of the invention.

Specifically, FIG. 2 is a block diagram illustrating an energy bidding apparatus according to an embodiment of the invention. Referring to FIG. 1 and FIG. 2 together, an energy bidding apparatus 20 according to the embodiments of the invention serves as, for example, the energy aggregator 10 that can determine an energy supply configuration between the energy suppliers 1 to M and the energy demanders 1 to N. Among them, the energy bidding apparatus 20 is, a computer apparatus, such as a computer, a workstation, a server and the like, and is provided with components including a connection device 22, a storage device 24, and a processor 26.

Details regarding those components are described as follows.

The connection device 22 is, for example, any wired or wireless interface device capable of connecting with the energy suppliers 1 to M and the energy demanders 1 to N. The wired connection device may be universal serial bus (USB), RS232, universal asynchronous receiver/transmitter (UART), inter-integrated circuit (I2C), serial peripheral interface (SPI), display port, thunderbolt or local area network (LAN) interfaces, but not limited thereto. The wireless connection device may be a device that supports communications protocols including Wi-Fi (wireless fidelity), RFID, Bluetooth, infrared, NFC (near-field communication) or D2D (device-to-device), but not limited thereto.

The storage device 24 is, for example, a random access memory (RAM), a read-only memory (ROM), a flash memory, a hard disk or similar devices in any fixed or movable form or a combination of the above devices, and is configured to store a computer program that can be executed by the processor 26.

The processor 26 is, for example, a central processing unit (CPU) or other microprocessors programmable for general purpose or special purpose such as a microprocessor, a digital signal processor (DSP), a programmable controller, an application specific integrated circuit (ASIC), a programmable logic device (PLD) or other similar devices or a combination of above-mentioned devices. However, the invention is not limited in this regard. In this embodiment, the processor 26 can load the computer program from the storage device 24 to execute the method for reinforcement learning based energy bidding of the embodiment of the invention.

Figure 3:
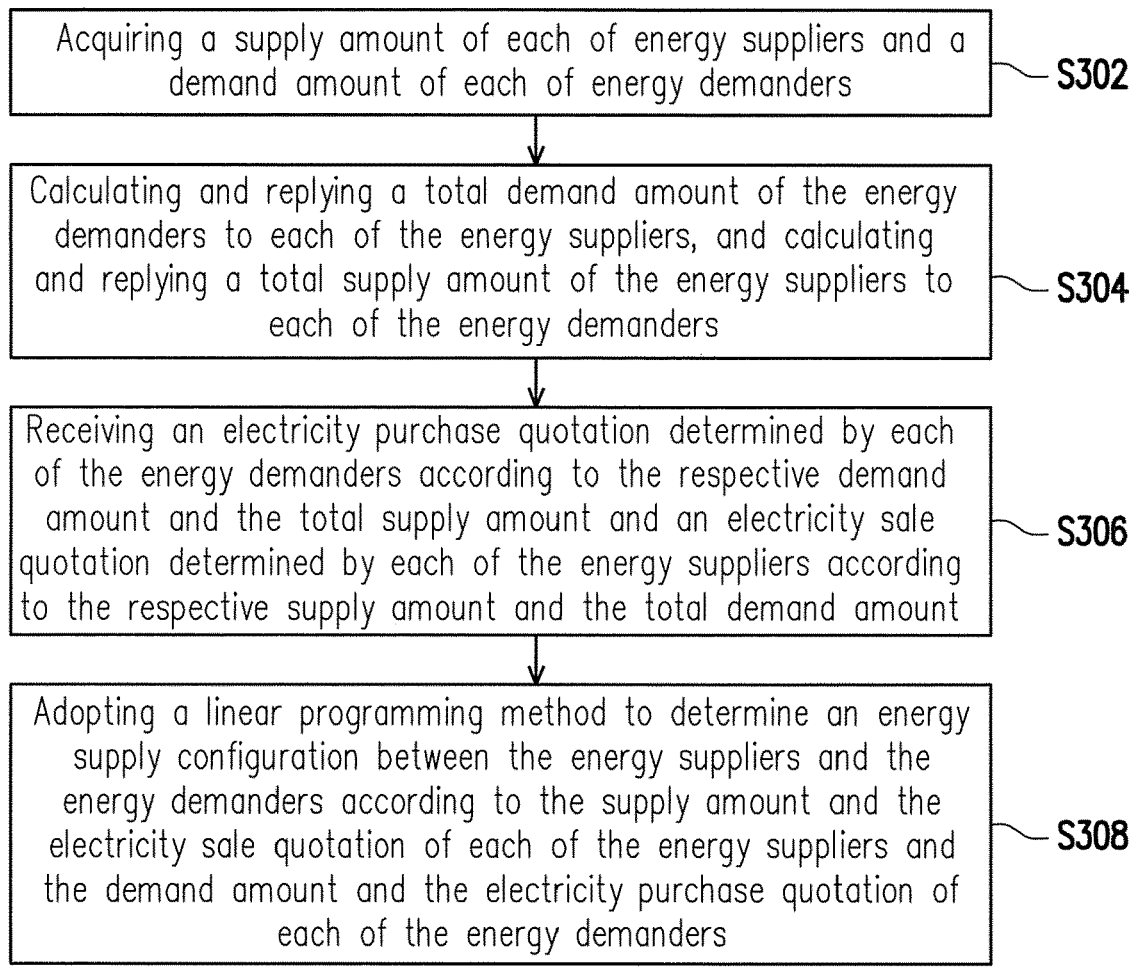
FIG. 3 is a flowchart illustrating a method for reinforcement learning based energy bidding according to an embodiment of the invention.

FIG. 3 is a flowchart illustrating a method for reinforcement learning based energy bidding according to an embodiment of the invention. Referring to FIG. 2 and FIG. 3 together, the method of this embodiment is applicable to the energy bidding apparatus 20 described above. Detailed steps in the method for energy bidding of the present embodiment are described below with the reference to various components of the energy bidding apparatus 20.

In step S202, the processor 16 acquires a supply amount of each of the energy suppliers and a demand amount of each of the energy demanders by using the connection device 12. In an embodiment, for example, the processor 16 receives the supply amount actively uploaded by each of the energy suppliers and the demand amount actively uploaded by each of the energy demanders by using the connection device 12. In other embodiments, after receiving the demand amounts of energy proposed by the energy demanders, the processor 16 can also conduct a power distribution by sending an inquiry request to each of the energy suppliers for requesting each of the energy suppliers to reply the supply amounts of power currently available. The present embodiment is not limited by the implementations described above.

In step S204, the processor 16 calculates a total demand amount of the energy demanders, replies the calculated total demand amount to each of the energy suppliers by using the connection device 12, calculates a total supply amount of the energy suppliers, and replies the calculated total supply amount to each of the energy demanders by using the connection device 12. Here, because the information replied to each of the energy suppliers by the processor 16 contains only the total demand amount of all the energy demanders at present without disclosing identities of the energy demanders, privacy of the energy demanders can be ensured. Likewise, because the information replied to each of the energy demanders by the processor 16 contains only the total supply amount of electricity that all the energy suppliers can provide at the present without disclosing identities of the energy suppliers, privacy of the energy supplier can be ensured.

In step S206, the processor 16 receives an electricity purchase quotation determined by each of the energy demanders according to the respective demand amount and the total supply amount and an electricity sale quotation determined by each of the energy suppliers according to the respective supply amount and the total demand amount by using the connection device 12. Here, according to the currently obtained information, each of the energy suppliers and each of the energy demanders can use a reinforcement learning (Q-learning) method to learn and determine the quotations adapted for the current situation, so as to maximize the profits of their own. The reinforcement learning method includes a learning phase and an execution phase, which will be described in detail with reference to the embodiments below.

For the energy suppliers in the learning phase, each of the energy suppliers calculates a difference between its own supply amount and the total demand amount of the energy demanders, proposes a plurality of electricity sale quotations in response to the difference to the energy aggregator, receives an electricity sale amount assigned by the energy aggregator in response to each of the electricity sale quotations, calculates an electricity sale profit for each of the proposed electricity sale quotations, selects a highest profit among the electricity sale profits, and records the electricity sale quotation corresponding to the highest profit as a recommended quotation for the difference in a reinforcement learning table.

In detail, a maximized profit of the energy supplier may be expressed by the following mathematical expression:

$$\max_{q_j^t} \sum_{t=1}^{T} q_j^t \cdot G_j^t - L_j^{res} \qquad (1)$$

Therein, $G_j^t \leq G_{j,max}^t$, $$q_{min} \leq q_j^t \leq q_{max} \qquad (2)$$

$q_j^t$ denotes a sale price per unit energy expected; $G_j^t$ denotes the electricity sale amount; $L_j^{res}(\bullet)$ denotes a cost function of the electricity supplier; $G_{j,max}^t$ denotes a maximum value of the electricity sale amount; $q_{max}$ and $q_{min}$ denote upper and lower limits of the sale price respectively; T denotes a learning time length.

With the time T, the energy supplier can propose a plurality of electricity sale quotations to the energy aggregator, review the electricity sale amount assigned by the energy aggregator in response to each of the electricity sale quotations, and learn the electricity sale profit that can be obtained for each of the electricity sale quotations proposed after deducing the cost from the electricity sale quotation multiplied by the assigned energy sale amount. Accordingly, the energy supplier can find the electricity sale quotation that can maximize its own electricity sale profit in this state, and record the electricity sale quotation in the reinforcement learning table.

In the execution phase, after obtaining the total demand amount of the energy demanders replied by the energy aggregator, each of the energy suppliers can calculate a difference between its own supply amount and the total demand amount, and check the reinforcement learning table previously established based on the reinforcement learning method to find the recommended quotation adapted for the current difference as the electricity sale quotation provided to the energy aggregator. Because such quotation is an optimal quotation adapted for the current state (difference) obtained after reinforcement learning, the energy supplier can obtain the maximized profit by adopting such quotation.

On the other hand, for the energy demanders in the learning phase, each of the energy demanders calculates a difference between its own demand amount and the total supply amount of the energy suppliers, proposes a plurality of electricity purchase quotations in response to the difference to the energy aggregator, receives an electricity purchase amount assigned by the energy aggregator in response to each of the electricity purchase quotations, calculates an electricity purchase expense for each of the proposed electricity purchase quotations, selects a lowest expense among the electricity purchase expenses, and records the electricity purchase quotation corresponding to the lowest expense as a recommended quotation for the difference in the reinforcement learning table.

In certain embodiments, the energy demander further includes an energy storage device capable of storing electricity. The energy storage device of the energy demander may be modelized by the following mathematical expression:

$$\beta_i^{t+1} = \beta_i^t + \Delta\beta_i^t \qquad (3)$$

Therein, $\beta_i^{t+1}$ is electricity of the energy storage device at a next time, $\beta_i^t$ is electricity of the energy storage device at a current time, and $\Delta\beta_i^t$ is an electricity variation of the energy storage device. The energy storage device needs to meet the following constraint:

$$B_i^{th} \leq \beta_i^t \leq B_i^{cap} \qquad (4)$$

Therein, $B_i^{th}$ denotes a lower limit protection electricity amount of the energy storage device; $B_i^{cap}$ denotes a capacity of the energy storage device. Accordingly, a minimized expense of the energy demander may be expressed by the following mathematical expression:

$$\min_{p_i^t} \sum_{t=1}^{T} [p_i^t \cdot D_i^t + L^{dis}(D_i^t, D_{i,des}^t)] \qquad (5)$$

Therein, $D_{i,min} \leq D_i^t \leq D_{i,des}^t + (B_i^{cap} - \beta_i^t)$, $$p_{min} \leq p_i^t \leq p_{max} \qquad (6)$$

$p_i^t$ denotes the electricity purchase quotation proposed by the energy demander; $D_i^t$ denotes the electricity purchase amount of the energy demander assigned by the energy aggregator; $L^{dis}(\bullet)$ denotes a satisfaction function of the energy demander; $D_{i,min}$ denotes a basic demand amount; $D_{i,des}^t$ denotes the energy demand amount proposed by the energy demander; $p_{max}$ and $p_{min}$ denote upper and lower limits of a purchase price respectively; $B_i^{cap}$ denotes the capacity of the energy storage device of the energy storage device; T denotes a learning time length.

$L^{dis}(D_i^t, D_{i,des}^t)$ denotes the satisfaction function for the electricity purchase amount $D_i^t$ assigned by the energy aggregator after the energy demand amount $D_{i,des}^t$ is proposed by the energy demander, which is defined as follows.

$$L^{dis}(D_i^t, D_{i,des}^t) = \begin{cases} \alpha_i(D_{i,des}^t - D_i^t)^2 & \text{, if } D_i^t \leq D_{i,des}^t \\ 0 & \text{, if } D_i^t \geq D_{i,des}^t \end{cases} \qquad (7)$$

Therein, a value of an adjustment a, is, for example, defined as $0 \leq \alpha_i \leq 1$ to enable different personal preferences. For example, a greater a, indicates that the difference causes more dissatisfaction. Otherwise, a smaller $\alpha_i$ indicates that the difference causes less dissatisfaction.

With the time T, the energy demander can propose a plurality of electricity purchase quotations to the energy aggregator, and review the electricity purchase amount assigned by the energy aggregator in response to each of the electricity purchase quotations. After adding a function value of the satisfaction function to a product of the electricity purchase quotation and the assigned electricity purchase amount, for each of electricity purchase quotations, a calculation result thereof may be used as the electricity purchase expanse. Accordingly, the energy demander can find the electricity purchase quotation that can minimize its own electricity purchase expense in this state, and records the electricity purchase quotation in the reinforcement learning table.

In the execution phase, after obtaining the total supply amount of the energy suppliers replied by the energy aggregator, each of the energy demanders can calculate a difference between its own demand amount and the total supply amount, check the reinforcement learning table previously established based on the reinforcement learning method to find a recommended quotation adapted for the current difference as the electricity purchase quotation provided to the energy aggregator. Because such quotation is an optimal quotation adapted for the current state (difference) obtained after reinforcement learning, the energy supplier can achieve the minimized expense by adopting such quotation.

It should be noted that, in other embodiments, each of the energy demanders may also use only the calculation result obtained by multiplying each of the electricity purchase quotations by the assigned electricity purchase amount as the electricity purchase expense to evaluate the electricity purchase quotation that can minimize the respective electricity purchase expense without taking the satisfaction function into consideration, and record the electricity purchase quotation in the reinforcement learning table. Alternatively, each of the energy demanders may also take other functions into consideration, and the present embodiment is not limited thereto.

Referring back to the process of FIG. 3, in step S308, after receiving the electricity purchase quotations proposed by each of the energy demanders and the electricity sale quotation proposed by each of the energy suppliers, the processor 26 can adopt a linear programming method to determine the energy supply configuration between the energy suppliers and the energy demanders according to the supply amount and the electricity sale quotation of each of the energy suppliers and the demand amount and the electricity purchase quotation of each of the energy demanders.

Figure 4:
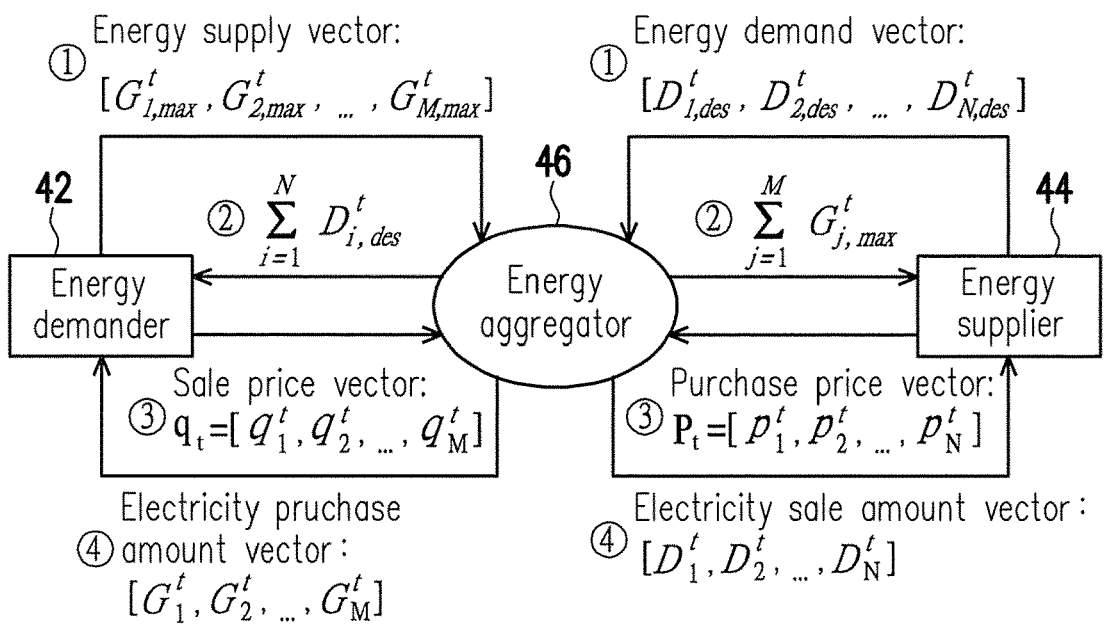
FIG. 4 illustrates an example of a method for reinforcement learning based energy bidding according to an embodiment of the invention.

Specifically, FIG. 4 illustrates an example of a method for reinforcement learning based energy bidding according to an embodiment of the invention. With reference to FIG. 4, the present embodiment shows an information exchange mechanism of an energy market at a time t.

In step ①, an energy aggregator 46 receives an energy supply vector $[G_{1,max}^t, G_{2,max}^t, \ldots, G_{M,max}^t]$ formed by the supply amounts proposed by each of the energy, suppliers 42 and an energy demand vector $[D_{1,des}^t, D_{2,des}^t, \ldots, D_{N,des}^t]$ formed by the demand amounts proposed by each of the energy demanders 42.

In step ②, the energy aggregator 46 obtains a total demand amount $\Sigma_{i=1}^{N} D_{i,des}^t$ by summing up the demand amounts in the energy demand vector, replies the total demand amount to each of the energy suppliers 42, obtains a total supply amount $\Sigma_{j=1}^{M} G_{j,des}^t$ by summing up the supply amounts in the energy supply vector, and replies the total supply amount to each of the energy demanders 46. In step ③, each of the energy suppliers 42 determines the electricity sale quotation according to its own supply amount and the total demand amount and transmits the electricity sale quotation to the energy aggregator 46, wherein the energy aggregator 46 receives a sale price vector $p_t=[p_1^t, p_2^t, \ldots, p_N^t]$ formed by the electricity sale quotations determined by each of the energy supplier 42.

In step ③, each of the energy demanders 46 also determines the electricity purchase quotation according to its own demand amount and the total supply amount and transmits the electricity purchase quotation to the energy aggregator 46, wherein the energy aggregator 46 receives a purchase price vector $q_t=[q_1^t, q_2^t, \ldots, q_M^t]$ formed by the electricity purchase quotations determined by each of the energy demanders 46.

In step ④, according to the energy supply vector and the sale price vector from the energy supplier 42 and the energy demand vector and the purchase price vector from the energy demander 46, the energy aggregator 46 adopts the linear programming method to determine the electricity sale amount, i.e., the amount of electricity that each of the energy suppliers 42 can sell (for forming an electricity sale amount vector $[G_1^t, G_2^t, \ldots, G_M^t]$) and the electricity purchase amount, i.e., the amount of electricity that each of the energy demanders 46 can purchase (for forming an electricity purchase amount vector $[D_1^t, D_2^t, \ldots, D_N^t]$), which are then provided to the corresponding energy supplier 42 and the corresponding energy demander 46.

Based on the information exchanged between the energy suppliers and the energy demanders, the processor 26 of this embodiment of the invention can use a product of the purchase price vector of the electricity purchase quotations of the energy demanders and the electricity purchase amount vector of electricity purchase quotas assigned to the energy demanders as an income and use a product of the sale price vector of the electricity sale quotations of the energy suppliers and the electricity sale amount vector of electricity sale quotas assigned to the energy suppliers as an expense to obtain a solution for maximizing a difference between the income and the expanse by adopting the linear programming method and accordingly determining the energy supply configuration.

In detail, a maximized profit of the energy aggregator may be expressed by the following mathematical expression:

$$\max_{D_i^t, G_j^t} \left( \sum_{i=1}^{N} p_i^t \cdot D_i^t - \sum_{j=1}^{M} q_j^t \cdot G_j^t \right) \quad (8)$$

Therein, $$G_j^t \leq G_{j,max}^t,$$

$$q_{min} \leq q_j^t \leq q_{max},$$

$$D_{i,min} \leq D_i^t \leq D_{i,des}^t,$$

$$p_{min} \leq p_i^t \leq p_{max} \quad (9)$$

$p_i^t$ denotes the electricity purchase quotation proposed by the energy demander; $D_i^t$ denotes the electricity purchase amount of the energy demander assigned by the energy aggregator; $q_j^t$ denotes the sale price per unit energy expected; $G_j^t$ denotes the electricity sale amount; $G_{j,max}^t$ denotes the maximum value of the electricity sale amount; $q_{max}$ and $q_{min}$ denote the upper and lower limits of the sale price respectively; $D_{i,min}$ denotes the basic demand amount; $D_{i,des}$ denotes the energy demand amount proposed by the energy demander; $p_{max}$ and $p_{min}$ denote the upper and lower limits of the purchase price, respectively.

In the embodiment above, an optimization of the formula (8) may be simplified to find an optimal pricing strategy for the energy suppliers and the energy demanders. Here, the energy aggregator plays the role of an environment to communicate and interact as an intermediary between the energy suppliers and the energy demanders. In certain embodiments, the energy aggregator considers how to purchase the required electricity from the energy supplier at the lowest price.

Figure 5:
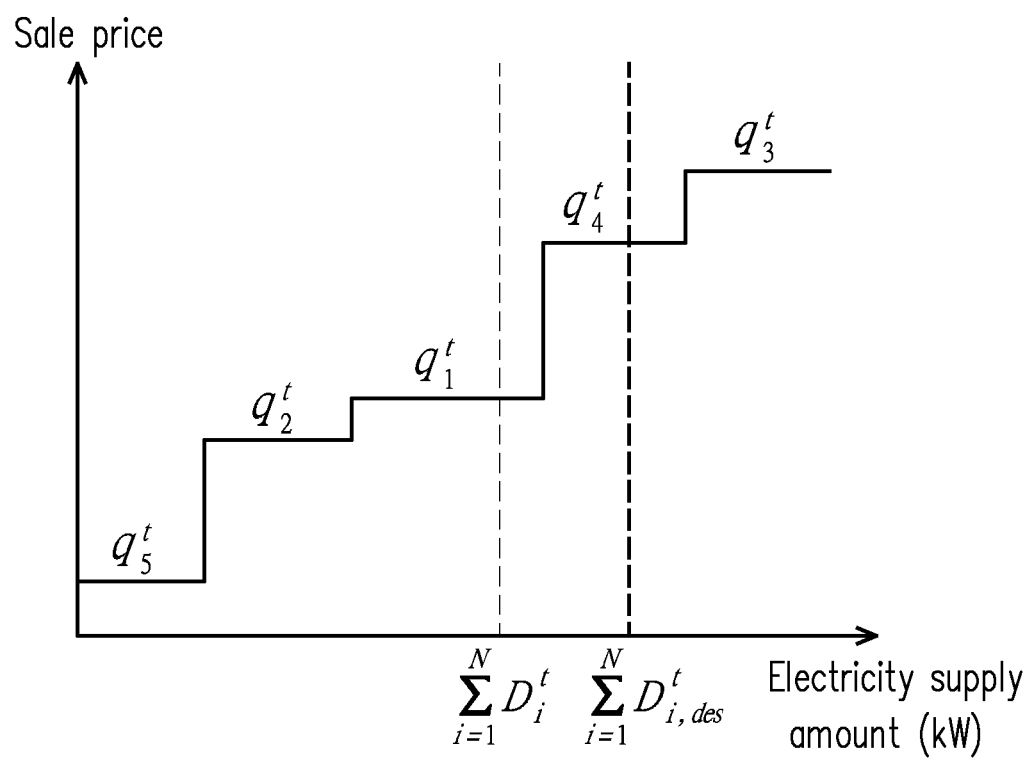
FIG. 5 is a schematic diagram illustrating the behavior of the energy aggregator for purchasing electricity from the energy supplier according to an embodiment of the invention.

For instance, FIG. 5 is a schematic diagram illustrating the behavior of the energy aggregator for purchasing electricity from the energy supplier according to an embodiment of the invention. With reference to FIG. 5, if the electricity sale quotations obtained from the energy suppliers by the energy aggregator are $q_1^t \sim q_5^t$, the energy aggregator can sort the electricity sale quotations in an ascending order to obtain the electricity sale quotations $q_5^t$, $q_2^t$, $q_1^t$, $q_4^t$ and $q_3^t$ a sequence from the lowest to the highest, as sequentially illustrated in a relationship chart of the supply amount versus the price in FIG. 5. In the relationship chart, starting from the energy supplier having a lowest electricity sale quotation (i.e., the energy supplier with the quotation of $q_5^t$), the energy aggregator can sequentially select the energy suppliers having the quotations $q_5^t$, $q_2^t$, $q_1^t$ and $q_4^t$ to be the energy suppliers serving as a power supply source until a total supply amount $\Sigma_{i=1}^N D_i^t$ of the selected energy suppliers reaches the total demand amount $\Sigma_{i=1}^N D_{i,des}^t$.

It should be noted that, after the energy supply configuration between the energy suppliers and the energy demanders is determined by the processor 26 of the energy bidding apparatus 20 (i.e., step S308), each of the energy demanders and each of the energy suppliers can update their own reinforcement learning tables when a specific event occurs (e.g., when the supply amount or the demand amount changes) or on a regular basis so that a learning value in the reinforcement learning tables can be close to the current state or condition.

For instance, at the time t, after selecting an optimal action $\alpha_t$ (i.e., the optimal quotation) in a current state $s_t$ the energy aggregator can receive a reward $r_{t+1}$ (i.e., a profit, such as the electricity sale amount times the electricity sale quotation in the case of the energy supplier), and transition to a next state $s_{t+1}$. At a time t+1, the energy aggregator can update the learning value (i.e., a Q value) in the condition ($s_t$, $\alpha_t$) by the following formula:

$$Q(s_t, a_t) = (1-\lambda) \cdot Q(s_t, a_t) + \lambda \cdot \left( r_{t+1} + \gamma \cdot \max_{a_{t+1} \in \mathcal{A}} Q(s_{t+1}, a_{t+1}) \right) \quad (10)$$

Therein, $\lambda$ is a learning rate, and $\gamma$ denotes a discount factor in the RL algorithm.

In summary, in the method and the apparatus for reinforcement learning based energy bidding according to the embodiments of the invention, a reinforcement learning based quotation bidding mechanism under a renewable aggregation architecture is proposed for both the energy suppliers and the energy demanders so the energy demander can propose an ideal quotation adapted for the current state. Further, incorporating satisfaction into the learning model can push the energy demander to be actively involved even further.

It will be apparent to those skilled in the art that various modifications and variations can be made to the disclosed embodiments. It is intended that the specification and examples be considered as exemplary only, with a true scope of the disclosure being indicated by the following claims and their equivalents.

The invention claimed is:

1. A method for reinforcement learning based energy bidding, adapted for an energy aggregator to determine an energy supply configuration between a plurality of energy suppliers and a plurality of energy demanders, the method comprising:

acquiring a supply amount of electricity currently available of each of the energy suppliers and a demand amount of required electricity of each of the energy demanders, wherein the supply amount is acquired from each of the energy suppliers, and the demand amount is acquired from each of the energy demanders;

calculating and replying a total demand amount of the energy demanders to each of the energy suppliers, and calculating and replying a total supply amount of the energy suppliers to each of the energy demanders;

receiving an electricity purchase quotation determined by each of the energy demanders according to the respective demand amount and the total supply amount and an electricity sale quotation determined by each of the energy suppliers according to the respective supply amount and the total demand amount, wherein a first difference between the respective supply amount and the total demand amount of the energy demanders is calculated by each of the energy suppliers, and a reinforcement learning table established based on a reinforcement learning method is checked by each of the energy suppliers to find a recommended quotation adapted for the first difference as the electricity sale quotation provided to the energy aggregator, wherein a second difference between the respective demand amount and the total supply amount of the energy suppliers is calculated by each of the energy demanders, and a reinforcement learning table established based on a reinforcement learning method is checked by each of the energy demanders to find a recommended quotation adapted for the second difference as the electricity purchase quotation provided to the energy aggregator; and adopting a linear programming method to determine the energy supply configuration between the energy suppliers and the energy demanders according to the supply amount and the electricity sale quotation provided by each of the energy suppliers and the demand amount and the electricity purchase quotation provided by each of the energy demanders.

2. The method according to claim 1, wherein before the step of checking the reinforcement learning table established based on the reinforcement learning method to find the recommended quotation adapted for the first difference by each of the energy suppliers, the method further comprises:

proposing a plurality of electricity sale quotations in response to the first difference between the supply amount and the total demand amount to the energy aggregator, and receiving an electricity sale amount assigned by the energy aggregator in response to each of the electricity sale quotations to calculate an electricity sale profit for each of the proposed electricity sale quotations; and selecting the electricity sale quotation corresponding to a highest electricity sale profit among the electricity sale profits as the recommended quotation adapted for the first difference, and recording the recommended quotation in the reinforcement learning table.

3. The method according to claim 1, wherein before the step of checking the reinforcement learning table established based on the reinforcement learning method to find the recommended quotation adapted for the second difference by each of the energy demanders, the method further comprises:

proposing a plurality of electricity purchase quotations in response to the second difference between the demand amount and the total supply amount to the energy aggregator, and receiving an electricity purchase amount assigned by the energy aggregator in response to each of the electricity purchase quotations to calculate an electricity purchase expense for each of the proposed electricity purchase quotations; and selecting the electricity purchase quotation corresponding to a lowest electricity purchase expense among the electricity sale expenses as the recommended quotation adapted for the second difference, and recording the recommended quotation in the reinforcement learning table.

4. The method according to claim 1, wherein before the step of checking the reinforcement learning table established based on the reinforcement learning method to find the recommended quotation adapted for the second difference by each of the energy demanders, the method further comprises:

proposing a plurality of electricity purchase quotations in response to the second difference between the demand amount and the total supply amount to the energy aggregator, and receiving an electricity purchase amount assigned by the energy aggregator in response to each of the electricity purchase quotations to calculate an electricity purchase expense for each of the proposed electricity purchase quotations;

substituting the demand amount and the electricity purchase amount assigned by the energy aggregator in response to each of the electricity purchase quotations into a satisfaction function to calculate a satisfaction function value; and calculating a sum of the satisfaction function value and the electricity purchase expense for each of the electricity purchase quotations, selecting the electricity purchase quotation corresponding to a lowest sum among the sums as the recommended quotation adapted for the second difference, and recording the recommended quotation in the reinforcement learning table.

5. The method according to claim 1, wherein the step of adopting the linear programming method to determine the energy supply configuration between the energy suppliers and the energy demanders according to the supply amount and the electricity sale quotation provided by each of the energy suppliers and the demand amount and the electricity purchase quotation provided by each of the energy demanders comprises:

by using a product of a purchase price vector of the electricity purchase quotations of the energy demanders and an electricity purchase amount vector of electricity purchase quotas assigned to the energy demanders as an income and using a product of a sale price vector of the electricity sale quotations of the energy suppliers and an electricity sale amount vector of electricity sale quotas assigned to the energy suppliers as an expense, adopting the linear programming method to obtain a solution for maximizing a difference between the income and the expanse, and accordingly determining the energy supply configuration.

6. The method according to claim 1, wherein the step of adopting the linear programming method to determine the energy supply configuration between the energy suppliers and the energy demanders according to the supply amount and the electricity sale quotation provided by each of the energy suppliers and the demand amount and the electricity purchase quotation provided by each of the energy demanders comprises:

sorting the electricity sale quotations of the energy suppliers in an ascending order, and selecting the energy suppliers as a power supply source starting from the energy supplier having a lowest electricity sale quotation among the electricity sale quotations until a total supply amount of the selected energy suppliers reaches the total demand amount.

7. An energy bidding apparatus for reinforcement learning based energy bidding, the energy bidding apparatus serving as an energy aggregator to determine an energy supply configuration between a plurality of energy suppliers and a plurality of energy demanders, and comprising:

a connection device, connecting each of the energy suppliers and each of the energy demanders;

a storage device, storing a computer program; and a processor, coupled to the connection device and the storage device, and configured to load in and execute the computer program for:

acquiring a supply amount of electricity currently available of each of the energy suppliers and a demand amount of required electricity of each of the energy demanders, wherein the supply amount is acquired from each of the energy suppliers, and the demand amount is acquired from each of the energy demanders;

calculating and replying a total demand amount of the energy demanders to each of the energy suppliers, and calculating and replying a total supply amount of the energy suppliers to each of the energy demanders;

receiving an electricity purchase quotation determined by each of the energy demanders according to the respective demand amount and the total supply amount and an electricity sale quotation determined by each of the energy suppliers according to the respective supply amount and the total demand amount, wherein each of the energy suppliers calculates a first difference between the respective supply amount and the total demand amount of the energy demanders and checks a reinforcement learning table established based on a reinforcement learning method to find a recommended quotation adapted for the first difference as the electricity sale quotation provided to the energy aggregator, wherein each of the energy demanders calculates a second difference between the respective demand amount and the total supply amount of the energy suppliers and checks a reinforcement learning table established based on a reinforcement learning method to find a recommended quotation adapted for the second difference as the electricity purchase quotation provided to the energy aggregator; and adopting a linear programming method to determine the energy supply configuration between the energy suppliers and the energy demanders according to the supply amount and the electricity sale quotation provided by each of the energy suppliers and the demand amount and the electricity purchase quotation provided by each of the energy demanders.

8. The energy bidding apparatus for reinforcement learning based energy bidding according to claim 7, wherein each of the energy suppliers further proposes a plurality of electricity sale quotations in response to the first difference between the supply amount and the total demand amount to the energy aggregator, receives an electricity sale amount assigned by the energy aggregator in response to each of the electricity sale quotations to calculate an electricity sale profit for each of the proposed electricity sale quotations, selects the electricity sale quotation corresponding to a highest electricity sale profit among the electricity sale profits as the recommended quotation adapted for the first difference, and records the recommended quotation in the reinforcement learning table.

9. The energy bidding apparatus for reinforcement learning based energy bidding according to claim 7, wherein each of the energy demanders further proposes a plurality of electricity purchase quotations in response to the second difference between the demand amount and the total supply amount to the energy aggregator, receives an electricity purchase amount assigned by the energy aggregator in response to each of the electricity purchase quotations to calculate an electricity purchase expense for each of the proposed electricity purchase quotations, selects the electricity purchase quotation corresponding to a lowest electricity purchase expense among the electricity sale expenses as the recommended quotation adapted for the second difference, and records the recommended quotation in the reinforcement learning table.

10. The energy bidding apparatus for reinforcement learning based energy bidding according to claim 7, wherein each of the energy demanders further proposes a plurality of electricity purchase quotations in response to the second difference between the demand amount and the total supply amount to the energy aggregator, receives an electricity purchase amount assigned by the energy aggregator in response to each of the electricity purchase quotations to calculate an electricity purchase expense for each of the proposed electricity purchase quotations, substitutes the demand amount and the electricity purchase amount assigned by the energy aggregator in response to each of the electricity purchase quotations into a satisfaction function to calculate a satisfaction function value, calculates a sum of the satisfaction function value and the electricity purchase expense for each of the electricity purchase quotations, selects the electricity purchase quotation corresponding to a lowest sum among the sums as the recommended quotation adapted for the second difference, and records the recommended quotation in the reinforcement learning table.

11. The energy bidding apparatus for reinforcement learning based energy bidding according to claim 7, wherein by using a product of a purchase price vector of the electricity purchase quotations of the energy demanders and an electricity purchase amount vector of electricity purchase quotas assigned to the energy demanders as an income and using a product of a sale price vector of the electricity sale quotations of the energy suppliers and an electricity sale amount vector of electricity sale quotas assigned to the energy suppliers as an expense, the processor adopts the linear programming method to obtain a solution for maximizing a difference between the income and the expanse, and accordingly determines the energy supply configuration.

12. The energy bidding apparatus for reinforcement learning based energy bidding according to claim 7, wherein the processor sorts the electricity sale quotations of the energy suppliers in an ascending order, and selects the energy suppliers as a power supply source starting from the energy supplier having a lowest electricity sale quotation among the electricity sale quotations until a total supply amount of the selected energy suppliers reaches the total demand amount.

* * * * *